3,067,266
PROCESS FOR PRODUCING 1,3,3-TRICHLORO-PROPENE-1 FROM ALLYL CHLORIDE

Saverio Ranucci and Pier Giorgio Gatti, Milan, Italy, assignors to Montecatini Società Generale per l'Industria Mineraria e Chimica, Milan, Italy, a corporation of Italy
Filed Apr. 11, 1960, Ser. No. 25,499
Claims priority, application Italy Mar. 31, 1959
12 Claims. (Cl. 260—654)

This invention relates to a process for making a chlorinated olefin, principally 1,3,3-trichloropropene-1, by direct chlorination of another chlorinated olefin, principally allyl chloride, in a single stage, according to the following reaction:

$$CH_2=CH-CH_2Cl + 2Cl_2 \rightarrow CHCl=CH-CHCl_2 + 2HCl$$

The process may be summarized as follows. The starting chlorinated olefin is preheated up to a temperature close to or immediately below the reaction temperature (400° C. and above) and is then admixed with chlorine. This preheating is followed by immediate reaction, and thereafter by immediate cooling, with the absorption of the hydrochloric acid formed in the reaction. This is immediately followed by rectification of the products obtained, to separate said trichloropropene from the less chlorinated products. The latter are recycle to the reaction.

Figure 1:
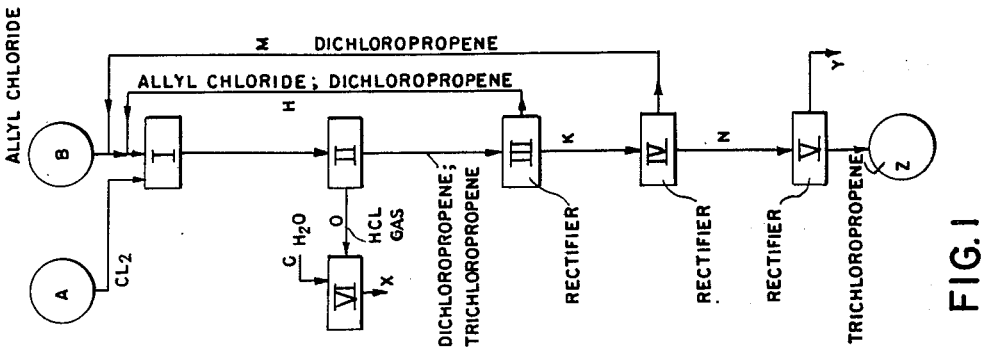

The process is illustrated in the flow diagram of FIG. 1 of the accompanying drawings. Chlorine is supplied at A and fresh allyl chloride is fed from B to the reaction stage I, the products of which are passed to the condensation stage designated II. The hydrochloric acid remains in the gaseous state, being passed at O to the absorption stage VI to which water is fed from C. Aqueous hydrochloric acid solution is discharged at X. From stage II the reaction product is passed to the rectification stage III, from which allyl chloride and a portion of dichloropropene are recycled through condit H to stage I. The remaining dichloropropene, trichloropropene and heaviest fractions are in the meanwhile passed through pipe K to the vacuum rectification stage IV. From the latter stage the remaining dichloropropene is recycled at M to stage I, while trichloropropene and the heaviest fractions, designated N, are passed to stage V for further vacuum rectification. The heaviest fractions are discharged at Y, commercial trichloropropene being obtained as end product Z.

Figure 3:
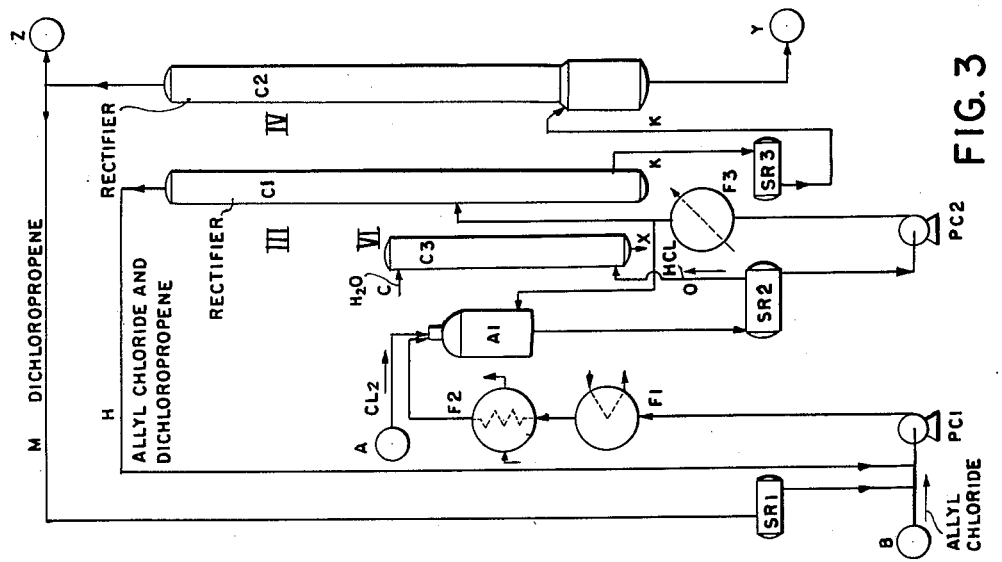
Figure 2:
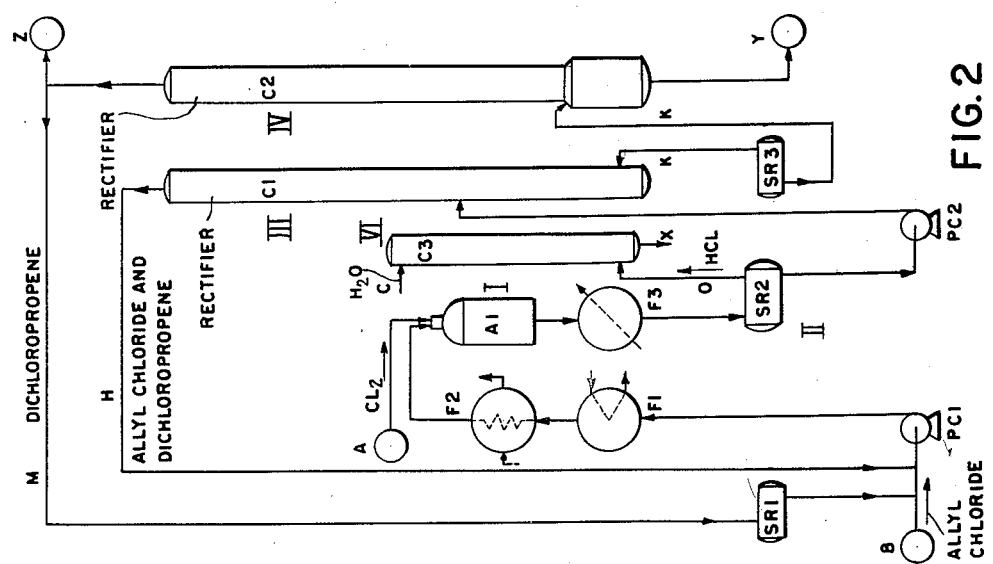

FIG. 2 is a more detailed flow diagram, a symbolic representation of the apparatus equipment being provided therein. The third rectification stage V of FIG. 1 is not shown in FIG. 2, but obviously may be added. FIG. 3 shows a variant of FIG. 2. Like reference characters found in FIGS. 1, 2 and 3 designate the same operations and apparatus.

With reference to FIG. 2, fresh allyl chloride and the recycled portion coming from the rectification are fed to evaporator F1. The vapors here developed are preheated in preheater F2, being then mixed with chlorine from A and introduced into the chlorination reactor A1. The reaction takes place in reactor A1 in the presence of a large amount of recycled chlorinated olefins so as to have present a high molar ratio of chlorinated olefins to chlorine.

The reaction products are condensed in cooler F3, a condenser, the hydrochloric acid being separated from the chlorinated olefins in vessel SR2 and absorbed in water in column C3.

The liquid chlorinated olefins are then passed to the rectification column C1 by pump PC2. At the top of this column the unreacted allyl chloride and dichloropropene are separated and returned by pipe H and pump PC1 to the reactor A1. From the bottom of column C1 the trichlorinated product is obtained, together with a small amount of dichloropropene and products having a higher boiling point than trichloropropene. This mixture is fed through conduit K and vessel SR3 to the non-continuous rectification column C2 which yields dichloropropene as a top. The latter is sent through pipe M and vessel SR1 to the reactor, by pump PC1. Trichloropropene having a content of 1,3,3 isomer varying from 65% to 75% of the trichlorinated product is removed at Z. The heaviest fraction is removed at Y.

From the flow sheet of FIG. 2 it is evident that, to the reactor A1, a mixture of fresh allyl chloride and of recycled chlorinated products is fed from the two rectification columns. This is also true of FIG. 1. Under normal operating conditions this feeding mixture consists of allyl chloride and dichloropropene. The conditions are thus predetermined so that the number of allyl chloride mols transformed into dichloropropene is equal to the number of dichloropropene mols which are transformed into trichloropropene.

It has been found that at the temperature of 470° to 490° C. the reaction product is subject to decomposition, to produce carbon residues. It is therefore necessary to limit to a minimum the time of stay at a high temperature, namely to that needed for completing the reaction.

With this in view, in a further embodiment of the process, the flow-diagram shown in FIG. 2 is modified as shown in FIG. 3 to provide quick cooling of the reaction gases. Namely, the outlet of pump PC2 is also connected to the outlet zone of reactor A1 for the purpose of recycling a large quantity of liquid reaction products at a temperature of 30° C. This injection into the outlet zone of the reactor produces a quick and effective cooling, bringing the temperature down to below 150° C. within a very short time.

The present invention is characterized by the following significant features:

(a) The chlorination of allyl chloride to trichloropropene is carried out in a single reaction stage and in the presence of a total recycle of the products lighter than trichloropropene, the working conditions being such that the number of mols of allyl chloride transformed into dichloropropene is equal to the number of dichloropropene mols transformed into trichloropropene, as stated above.

(b) Preheating of the chlorinated olefins is carried out up to a temperature close to the reaction temperature. Any contact between the olefins and chlorine at low temperature is avoided, when effecting the admixing with chlorine.

(c) A cylindrical reactor is used, provided with a hemispheric joint in the upper part connecting the reactor to the mixer. Effective mixing of the reactants is obtained by equidirectional parallel or tangential collision of the two gaseous streams at high speed.

(d) Immediate and effective cooling of the reaction products is carried out in order to avoid their decomposition resulting in a carbon deposit.

The temperature range has been investigated. A special study was made of the reaction at temperatures in the range between 470° and 490° C., with space velocities varying from 1000 to 3000 Nl/lh, preferably from 1050 and 2600 Nl/lh, and with a molar ratio of chlorinated olefins to chlorine varying from 3.5 to 6.0 preferably from 3.8 to 5.9.

It has been found that the best reaction conditions are at 490° C. with a space velocity of 2,600 Nl/lh and a molar ratio of chlorinated olefins to chlorine of 4.8. Under these conditions the yield of trichloropropene, namely the fraction which under a pressure of 50 mm. Hg (absolute) boils at between 45° and 65° C. and prevailingly consists of 1,3,3-trichloropropene-1 plus a small amount of its isomers, in respect of allyl chloride, was 70%.

This result is surprising for several reasons. It was expected that a great decrease in yield would occur due to side reactions. Such decrease was also to be expected due to the fact that the operation is carried out in the presence of undesired isomers, and the fact that two different reactions take place in the same reactor, namely the transformation of allyl chloride into dichloropropene and the further reaction of the mixture of recycled material comprising dichloropropene. It was surprising to find that when tests were carried out in two distinct stages, namely by first producing dichloropropene from allyl chloride, separating the useful isomer of dichloropropene from the reaction mixture, and then transforming the purified dichloropropene into trichloropropene, the yield of 1,3,3 isomer in respect of the starting allyl chloride is 15% lower than that obtained by the one-step process of the present invention.

The invention is illustrated by the following examples. They were selected as the most significant ones, in order to show the influence of the variables upon the course of the process and upon the respective yields. These embodiments are in no sense to be considered as limitative.

*Example 1*

| | | |
|---|---|---|
| Reaction temperature | °C | 490 |
| Chlorine flow rate | g./h | 1,108 |
| Flow rate of the chlorinated olefins fed to the reactor | g./h | 7,000 |
| Composition of said mixture: | | |
|    Allyl chloride | percent by weight | 44.7 |
|    Dichloropropene | do | 55.3 |
| Chlorinated olefins/chlorine molar ratio | percent by weight | 4.8 |
| Space velocity | Nl/lh | 2,600 |
| Products obtained at the outlet of the reactor | g./h | 8,100 |
| Composition of these products: | | |
|    Hydrochloric acid | percent by weight | 7.5 |
|    Allyl chloride | do | 30 |
|    Dichloropropene | do | 48 |
|    Trichloropropene | do | 11.5 |
|    High-boiling | do | 3 |
| Consumption of fresh allyl chloride | g./h | 699 |
| Trichloropropene obtained | g./h | 924 |
| Hydrochloric acid obtained | g./h | 612 |
| High-boiling products obtained | g./h | 203 |
| Yield of the process | percent | 69.5 |

*Example 2*

| | | |
|---|---|---|
| Reaction temperature | °C | 490 |
| Chlorine flow rate | g./h | 880 |
| Flow rate of the chlorinated olefins fed to the reactor | g./h | 5,600 |
| Chlorinated olefins/chlorine molar ratio | | 4.9 |
| Space velocity | Nl/lh | 1,500 |
| Products obtained at the outlet of the reactor | g./h | 6,470 |
| Fresh allyl chloride consumed | g./h | 694 |
| Trichloropropene obtained | g./h | 750 |
| Hydrochloric acid obtained | g./h | 542 |
| High-boiling products obtained | g./h | 207 |
| Yield of the process | percent | 56.8 |

*Example 3*

| | | |
|---|---|---|
| Reaction temperature | °C | 470 |
| Chlorine flow rate | g./h | 888 |
| Flow rate of the chlorinated olefins fed to the reactor | g./h | 5,600 |
| Chlorinated olefins/chlorine molar ratio | | 4.9 |
| Space velocity | Nl/lh | 1,500 |
| Products obtained at the outlet of the reactor | g./h | 6,480 |
| Fresh allyl chloride consumed | g./h | 614 |
| Trichloropropene obtained | g./h | 717 |
| Hydrochloric acid obtained | g./h | 472 |
| High-boiling products obtained | g./h | 207 |
| Yield of the process | percent | 61.4 |

*Example 4*

| | | |
|---|---|---|
| Reaction temperature | °C | 470 |
| Chlorine flow rate | g./h | 1,090 |
| Flow rate of the chlorinated olefins fed to the reactor | g./h | 5,400 |
| Chlorinated olefins/chlorine molar ratio | | 3.8 |
| Space velocity | Nl/lh | 1,500 |
| Products obtained at the outlet of the reactor | g./h | 6,480 |
| Fresh allyl chloride consumed | g./h | 720 |
| Trichloropropene obtained | g./h | 847 |
| Hydrochloric acid obtained | g./h | 585 |
| High-boiling products obtained | g./h | 234 |
| Yield of the process | percent | 61.8 |

*Example 5*

| | | |
|---|---|---|
| Reaction temperature | °C | 470 |
| Chlorine flow rate | g./h | 754 |
| Flow rate of the chlorinated olefins fed to the reactor | g./h | 5,900 |
| Chlorinated olefins/chlorine molar ratio | | 5.9 |
| Space velocity | Nl/lh | 1,500 |
| Products obtained at the outlet of the reactor | g./h | 6,650 |
| Fresh allyl chloride consumed | g./h | 530 |
| Trichloropropene obtained | g./h | 600 |
| Hydrochloric acid obtained | g./h | 406 |
| High-boiling products obtained | g./h | 210 |
| Yield of the process | percent | 59.5 |

*Example 6*

| | | |
|---|---|---|
| Reaction temperature | °C | 470 |
| Chlorine flow rate | g./h | 612 |
| Flow rate of the chlorinated olefins fed to the reactor | g./h | 4,000 |
| Chlorinated olefins/chlorine molar ratio | | 4.9 |
| Space velocity | Nl/lh | 1,050 |
| Products obtained at the outlet of the reactor | g./h | 4,600 |
| Fresh allyl chloride consumed | g./h | 440 |
| Trichloropropene obtained | g./h | 478 |
| Hydrochloric acid obtained | g./h | 377 |
| High-boiling products obtained | g./h | 117 |
| Yield of the process | percent | 57.3 |

*Example 7*

| | | |
|---|---|---|
| Reaction temperature | °C | 470 |
| Chlorine flow rate | g./h | 1,053 |
| Flow rate of the chlorinated olefins fed to the reactor | g./h | 7,000 |
| Chlorinated olefins/chlorine molar ratio | | 4.9 |
| Space velocity | Nl/lh | 2,600 |
| Products obtained at the outlet of the reactor | g./h | 8,050 |
| Fresh allyl chloride consumed | g./h | 676 |
| Trichloropropene obtained | g./h | 785 |
| Hydrochloric acid obtained | g./h | 546 |
| High-boiling point products obtained | g./h | 243 |
| Yield of the process | percent | 61 |

From the above examples, it appears that 1,3,3-trichloropropene-1 is obtained by chlorination of allyl chloride in conditions of equilibrium between the amount of allyl chloride fed and the amount of dichloropropenes fed by total recycle, the allyl chloride/dichloropropenes molar ratio of the feed being between 1.1 and 1.25, and the chlorinated olefins/ introduced chlorine ratio being between 3.5 and 6, at a space velocity of between 1000 and 3000 Nl/lh. The preferred latter ratio is 3.8 to 5.9. The preferred space velocity is between 1050 and 2600.

In the specification and claims, the symbol Nl/lh is adopted to denote: "litres of gas calculated at 0° C. and 760 mm. Hg, per litre reactor volume capacity per hour."

The amount of dichloropropene present in the reaction mass appears to be substantially constant for any of the equilibrium conditions exemplified.

Although the preferred reaction temperature is from 470° C. to 490° C., the process may be carried out, although less advantageously, in the range from 400° to 550° C. With a reaction temperature range of from 400° to 550° C., the corresponding range of preheating temperatures becomes from 300° to 450° C.

We claim:
1. A continuous process for preparing a product which is prevailingly 1,3,3-trichloropropene-1, comprising reacting chlorine with allyl chloride at a temperature of at least 400° C., fresh allyl chloride being continuously fed to the reaction zone, subjecting the reaction mixture to immediate chilling to below 150° C., removing the hydrogen chloride produced in the process, separating trichloropropene from the unreacted allyl chloride and the dichloropropene produced in the process, and recycling the dichloropropene and said unreacted allyl chloride to the reaction zone, said chlorinating being carried out in the presence of a substantially total recycle of the organic products lighter than trichloropropene, the molar ratio of chlorinated olefins to chlorine in the reaction zone being between 3.5 and 6.

2. A process according to claim 1, characterized in that the fresh and recycled starting chlorinated olefins are preheated up to a temperature close to the reaction temperature before mixing them with chlorine, to minimize reaction between chlorine and olefins at below said reaction temperature.

3. A process according to claim 1, characterized in that the chlorination reaction is carried out at temperatures between 470° and 490° C.

4. A process according to claim 1, characterized in that the reactants are introduced into the reaction at a space velocity of between 1000 and 3000 Nl/lh.

5. A process for making 1,3,3-trichloropropene-1, comprising reacting a mixture of chlorine and allyl chloride in a reaction zone which is at a temperature of at least 400° C., immediately chilling the exiting reaction products to a temperature below 150° C., separating allyl chloride and at least part of the dichloropropene produced in the reaction from the 1,3,3-trichloropropene-1, recycling the said allyl chloride and dichloropropene to the said reaction zone to react with fresh chloride and fresh allyl chloride, passing remaining dichloropropene and 1,3,3-trichloropropene-1, to a rectification zone to separate dichloropropene from said trichloropropene, and passing the latter dichloropropene to said reaction zone, the molar ratio of chlorinated olefins to chlorine in said reaction zone being at least about 3.5.

6. A process for making 1,3,3-trichloropropene-1, comprising separately preheating chlorine and allyl chloride, mixing the preheated chlorine and allyl chloride by impinging streams of the latter upon each other, immediately thereafter passing the mixture into a reaction zone which is at a temperature of at least 400° C., immediately chilling the exiting reaction products to a temperature below 150° C., separating gaseous hydrogen chloride from other reaction products by condensation of the latter, then subjecting the reaction products to rectification to separate allyl chloride and at least part of the dichloropropene produced in the reaction from the 1,3,3-trichloropropene-1, recycling the said allyl chloride and dichloropropene to the said reaction zone to react with fresh chlorine and fresh allyl chloride, passing remaining dichloropropene and 1,3,3-trichloropropene-1 from said rectification to a vacuum rectification to separate dichloropropene from said trichloropropene, and passing the latter dichloropropene to said reaction zone, said chilling of exiting reaction products being carried out by introducing cold liquefied organic products of the reaction thereinto the molar ratio of chlorinated olefins to chlorine in said reaction zone being at least about 3.5.

7. The process of claim 6, the reaction being carried out at from about 470° to about 490° C., the molar ratio of chlorine to chlorinated olefins being between 3.5 and 6.

8. The process of claim 7, the space velocity being between 1000 and 3000 Nl/lh.

9. A continuous process for preparing a product which is prevailingly 1,3,3-trichloropropene-1, comprising reacting chlorine with allyl chloride at a temperature of at least 400° C., fresh allyl chloride being continuously fed to the reaction zone, subjecting the reaction mixture to immediate chilling to below 150° C., removing the hydrogen chloride produced in the process, separating trichloropropene from the unreacted allyl chloride and the dichloropropene produced in the process, and recycling the dichloropropene and said unreacted allyl chloride to the reaction zone, said chlorinating being carried out in the presence of a substantially total recycle of the organic products lighter than trichloropropene, the molar ratio of chlorinated olefins to chlorine in the eaction zone being between 3.5 and 6, said chilling being carried out by introducing chlorinated olefins resulting from the reaction in cold, liquefied form.

10. The process defined in claim 9, the reaction being carried out at about 470° to 490° C., at a space velocity of about 1050 to 2600 liters of gas, calculated at 0° C. and 760 mm. mercury pressure, per liter of reaction volume capacity, per hour.

11. A process for making 1,3,3-trichloropropene-1, comprising separately preheating chlorine and allyl chloride to a temperature immediately below reaction temperature, mixing the preheated chlorine and allyl chloride, reacting the mixture in a reaction zone which is at a temperature of at least 400° C., immediately chilling the exiting reaction products to a temperature below 150° C., separating gaseous hydrogen chloride from other reaction products by condensation of the latter, then subjecting the reaction products to rectification to separate allyl chloride and at least part of the dichloropropene produced in the reaction from the 1,3,3-trichloropropene-1, recycling the said allyl chloride and dichloropropene to the said reaction zone to react with fresh chlorine and fresh allyl chloride, passing remaining dichloropropene and 1,3,3-trichloropropene-1 from said rectification to a vacuum rectification to separate the dichloropropene from said trichloropropene, and passing the latter dichloropropene to said reaction zone, so that the reaction is carried out with substantially total recycle of dichloropropene, the molar ratio of chlorinated olefins to chlorine in said reaction zone being at least about 3.5.

12. A process for making 1,3,3-trichloropropene-1, comprising reacting a mixture of chlorine and allyl chloride to produce dichloropropene and said trichloropropene, immediately chilling the exiting reaction products to a temperature below 150° C., separating unreacted allyl chloride and the dichloropropene produced in the reaction from the 1,3,3-trichloropropene-1, and reacting the said unreacted allyl chloride and dichloropropene with chlorine and fresh allyl chloride to produce said trichloropropene, the molar ratio of chlorinated olefins to chlorine in said reaction zone being at least about 3.5, the number of allyl chloride mols transformed into dichloropropene being substantially equal to the number of mols of dichloropropene transformed into trichloropropene.

References Cited in the file of this patent
UNITED STATES PATENTS 2,321,472    Engs et al. _____ June 8, 1943
2,688,642    Partansky _____ Sept. 7, 1954